UNITED STATES PATENT OFFICE.

HENRY WESSLING, OF HAYS STATION, PENNSYLVANIA.

REFRACTORY BRICK.

1,088,755.     Specification of Letters Patent.     Patented Mar. 3, 1914.

No Drawing.     Application filed March 30, 1912. Serial No. 687,544.

*To all whom it may concern:*

Be it known that I, HENRY WESSLING, a citizen of the United States, residing at Hays Station, in the county of Allegheny and State of Pennsylvania, have invented a new and useful Improvement in Refractory Brick, of which improvement the following is a specification.

My invention relates to refractory material or brick, and particularly to that class of fire brick known as silica brick.

Heretofore, so far as I am aware, in the production or manufacture of silica brick it has been impossible to bind the silica without the employment of substances such as lime, which fuse at a lower temperature than the silica itself, consequently the maximum fusing temperature of the brick was no greater than the bond or binding material employed.

The present applicant is one of the joint patentees of Letters Patent No. 710,707, dated June 3rd, 1902, and No. 710,708, dated June 3rd, 1902, for, respectively, process of producing silica bricks, and silica bricks.

The difficulty encountered in the use of the brick described in the last mentioned Letters Patent was the tendency to disintegrate or fall apart, due to the almost insuperable difficulty of so mixing the finely comminuted or bonding silica with the mass forming the brick as to bond or bind the mass uniformly throughout the brick. This in actual use was found to be a very difficult matter.

The present application is intended to remedy the difficulty found to exist in the manufacture of the above specified brick. Applicant has discovered that talc—acid magnesia silicate—commonly called soapstone, when reduced to a finely powdered state produces an ideal bond for silica brick or refractory material made from substantially pure silica. Magnesia, the per cent. of which is usually high in soapstone, minimizes the brittleness in products made of pure silica alone. It may also be that the other constituents of the soapstone are factors in the production of the bond; but whether this is true the fact remains that when the soapstone is reduced to a very fine powder and mixed with coarse substantially pure silica, brick of uniform toughness are produced and which are capable of withstanding the highest industrial temperature without danger of disintegration. The brick or material is produced by mixing the substantially pure silica after being reduced to the condition of fineness to which it is now usual to reduce it prior to compressing it into the form of brick with the bonding material in the proportions of six thousand pounds of silica to about one hundred fifty pounds of finely pulverized soapstone. The bonding material is preferably mixed with sufficient water to form a liquid in which the constituents of the powdered soapstone are held in suspension, and in this condition is poured into and mixed thoroughly with the coarse silica forming the brick. The bricks are then dried and burned in the usual manner. If desired the finely comminuted soapstone may be thoroughly mixed with the silica and the mixture formed into bricks or other form in the usual manner.

Having described my invention, what I claim and desire to secure by Letters Patent is:

1. As a new article of manufacture, a refractory brick formed of fine particles of silica bonded together by finely pulverized soapstone.

2. As a new article of manufacture, a refractory brick formed of silica and soapstone in substantially the proportion of six thousand pounds of silica to one hundred and fifty pounds of pulverized soapstone.

In testimony whereof, I have hereunto signed my name in the presence of two subscribing witnesses.

HENRY WESSLING.

In the presence of—
  CLARENCE A. WILLIAMS,
  JOHN H. RONEY.